May 12, 1970  AIMO IKÄHEIMO ET AL  3,511,071
PRESSURE MEANS FOR HYDROSTATIC EXTRUSION
Filed Oct. 23, 1967
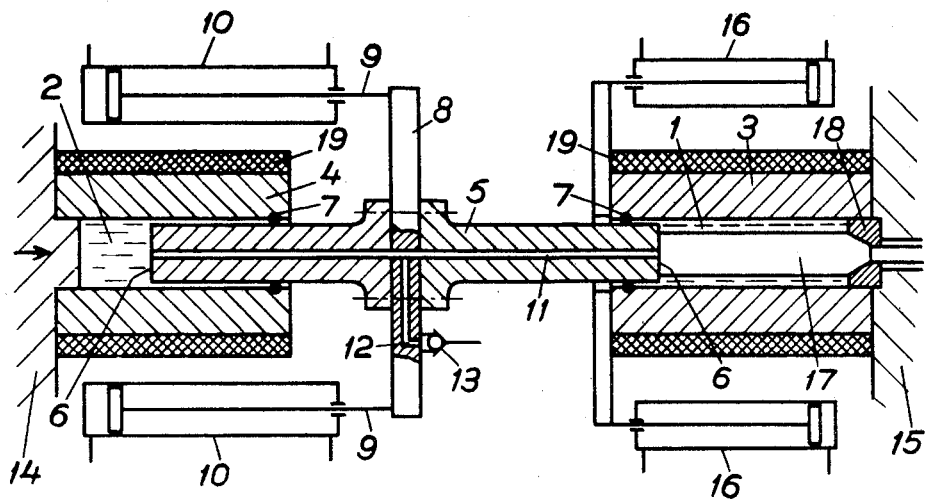
INVENTOR.
AIMO IKAHEIMO
STIG JOHNSON
TORSTEIN LANDA
BY
Jennings Bailey, Jr.

United States Patent Office 3,511,071
Patented May 12, 1970

3,511,071
PRESSURE MEANS FOR HYDROSTATIC EXTRUSION
Aimo Ikäheimo, Stig Johnson, and Torstein Landa, Vasteras, Sweden, assignors to Allmänna Svenska Elektriska Aktiebolaget, Vasteras, Sweden, a corporation of Sweden
Filed Oct. 23, 1967, Ser. No. 677,335
Int. Cl. B21c 23/00, 23/21
U.S. Cl. 72—253                                    7 Claims

ABSTRACT OF THE DISCLOSURE

An extrusion device has two cylinders moving towards each other one of which mates with a die; a piston member has two surfaces of equal areas one in each of the cylinders. Auxiliary cylinder and piston pressure means are provided which are connected to the piston means at a point between the two cylinders. The piston means has a longitudinal passage therein connecting the interiors of the two cylinders and to which pressure fluid can be supplied. Piston means is also provided for moving the cylinder which mates with the die away from the die.

BACKGROUND OF THE INVENTION

Field of the invention

The present invention relates to a pressure means for hydrostatic extrusion comprising two high pressure chambers movable towards each other (in the following called primary chamber and extrusion chamber), a common piston means movable in both the chambers and a conduit for pressure medium between the two chambers.

The prior art

The pressure means substantially as described have been used for a special type of hydrostatic extrusion, called augmented extrusion. In this type of extruding, contrary to common hydrostatic extrusion, a piston exerts thrust during the whole extrusion on the billet to be extruded so that in this way an extra mechanical power thrust is obtained which increases the total extrusion pressure (thus the word "augmented"). This extra force is obtained since during normal hydrostatic extrusion the piston which generates the pressure in the extrusion chamber is provided at its opposite end with a second, somewhat larger piston surface situated in a second pressure chamber which is pressed by the pressure means toward said larger piston surface and the volume decrease in the chamber thus provides the necessary high extruding pressure. In order to transmit the hydrostatic extruding pressure from the pressure chamber at the larger piston surface to the extrusion chamber, a pressure medium conduit is arranged between the two pressure chambers.

The extrusion process just described has several disadvantages. Firstly, an axial thrust is always obtained on the billet which means that the extruding press cannot be used at all for extruding rod-shaped billets of great slenderness ratio or for billets which are wound helically or in some other way. Secondly the axial thrust of the piston will always have a certain relation to the hydrostatic extrusion pressure and there is no way of controlling this relationship, which considerably decreases the value of the pressure means. Thirdly, the pressure means is made considerably more expensive since the two high pressure chambers must be different, that is have different internal diameters. Due to the above disadvantages augmented extrusion makes the pressure apparatus much more complicated and expensive. Thus the advantages can only in exceptional cases outweigh the disadvantages and the method has therefore not been used to any great extent.

SUMMARY OF THE INVENTION

The object of the present invention is to present a universal pressure means for hydrostatic extrusion in which, according to the requirements, extrusion may be carried out with or without extra mechanical thrust and in those cases where extra thrust is used to make it possible to control the magnitude and operating time arbitrarily within very wide limits. The invention is characterized in that the piston means mentioned in the introduction and movable in the two high pressure chambers comprises two pressure surfaces of equal area facing each other, each in one of said chambers and between the pressure surfaces outside the chambers are connection means to at least one, preferably two or more, auxiliary cylinders for movement of the piston means.

Although a pressure means according to the invention provides a universal pressure means with which extrusion can be carried out both with and without extra mechanical thrust, the cost of production for the pressure means is less than for known presses intended for extruding with extra mechanical thrust. In such a known press, for instance, it is necessary to arrange some form of operating means to move the piston situated between the high pressure chambers. In a press according to the invention the operating means of the piston is utilized both to displace the piston when necessary and also to provide extra mechanical thrust as necessary. Thus the availability of extra thrust for the extrusion does not involve any extra expense for the pressure means. Furthermore, the invention also has the advantage that the two high pressure chambers which are extremely highly loaded and comprise the most vital parts of the press can be made with identical cross sections, thus considerably decreasing manufacturing costs for these particularly expensive parts. The pressure surfaces of the piston means which are equal in area and facing each other are also necessary so that the piston means can be prevented from touching the substance in the extrusion chamber.

According to a preferred embodiment of the invention, the piston means is divided between the two high pressure chambers. This has several advantages. Firstly, the division plane is extremely suitable for attaching the connection means to the auxiliary cylinders. Secondly, due to the division, two relatively short piston parts are obtained which facilitates manufacture and makes the drilling of a connection channel between the high pressure chambers considerably easier. This connection channel should preferably have an extremely small cross section and in practice it is difficult to drill narrow holes in very long working pieces. Thirdly, it is desirable for there to be some way of supplying pressure medium to the high pressure chambers. Since, due to the shape and construction of the high pressure chambers, it is not feasible to drill radially through the surrounding cylinder wall, there remains in practice only the possibility that said supply conduits are arranged in the piston means. The division plane in the centre of the piston means offers good possibilities for the connection of a supply conduit to the through-running bushing connecting the high pressure chambers with each other.

BRIEF DESCRIPTION OF THE DRAWING

The invention will in the following be described more fully with reference to the accompanying drawing which shows schematically a pressure means according to the invention.

DESCRIPTION OF THE PREFERRED EMBODIMENTS

In the figure, 1 designates one high pressure chamber, the extrusion chamber, and 2 the other high pressure chamber, primary chamber. The steel cylinders surrounding the high pressure chambers are designated 3 and 4, respectively. A common piston means 5 extends into each high pressure chamber in which it has two pressure surfaces 6 equal in area and facing each other. Between the piston means 5 and the cylinders 3 and 4 are seals 7. The piston means 5 is divided approximately centrally and there provided with a lever 8 connected to the piston rods 9 in two stationary auxiliary cylinders 10. A through running axial channel 11 in the piston means 5 connects the primary chamber 2 with the extrusion chamber 1. A supply conduit 12 with non-return valve 13 is connected to the channel 11. The cylinder 4 of the primary chamber rests against a movable ram 14 which may be formed by the main piston of the pressure means. The cylinder 3 of the extrusion chamber rests against a stationary bed 15 but, with the help of auxiliary cylinders 16 it can be displaced axially from the bed 15 so that it is possible to insert from the side a substance 17 in extrusion position. Extrusion takes place through a nozzle 18. The cyliders 3 and 4 of the high pressure chambers are strongly prestressed with the help of tape or wire wound into a surrounding sheath 19.

The device shown operates in the following way:

The hydraulic press in which the device shown in the figure is inserted has a main pressure member, a pressure piston directly influencing the movable ram 14 and forcing it with considerable pressure to the right in the figure. The two high pressure chambers 1 and 2 are filled with pressure medium. The movement of the ram 14 endeavours to decrease the total volume in the high pressure chambers and thus the pressure of the hydraulic medium enclosed in the chambers increases rapidly. The pressure is equalized through the channel 11 so that it is equally great in both the high pressure chambers. The piston means 5 is not subjected to any axial force since the pressure on the two pressure surfaces 6, equal in area, is the same.

The pressure in the extrusion chamber 1 endeavours to force the billet 17 through the die 18. When the pressure has become sufficiently high extrusion commences and the billet 17 is forced relatively slowly out of the extrusion chamber. Since as small a liquid volume as possible is desired in the extrusion chamber the piston 5 is arranged with the help of auxiliary cylinders 10 to follow the substance 17 when it moves towards the nozzle 18. Some of the hydraulic medium in the extrusion chamber 1 will then flow through the channel 11 to the primary chamber 2. The quantity of liquid in the extrusion chamber thus decreases during the entire extrusion process and, at the final stage of the process when the piston means 5 reaches the nozzle 18, it is extremely small. This is particularly important since, due to the great elasticity which is characteristic of liquids under very high pressure, a great quantity of liquid in the extrusion chamber collects a considerable store of energy which ejects the billet with a violent force in the final stage of the extrusion. Due to the flow resistance in the long, narrow channel 11 the corresponding spurt of energy from the liquid in the primary chamber is effectively retarded and in this way it is possible to control the critical final stage of the extrusion. By suitable choice of the flow resistance in the channel 11—possibly a special throttle means may be arranged for example in the division plane at the centre of the piston means—and suitable design of the bottom of the extrusion chamber and the extrusion nozzle, an automatic control of the final stage of the extrusion can be achieved since the extrusion substance leaves the chamber more rapidly than new pressure medium can flow in through the channel 11. Thus the energy stored in the pressure medium in the extrusion chamber is used to complete the final phase of the extrusion and there is thus no unmanageable energy discharge when the substance completely leaves the extrusion nozzle.

In certain cases it may be favourable, at least during the initial stages of the extrusion, to press the billet 17 against the die. Such a pressure is effected with the help of the piston 5 which is then activated by the auxiliary cylinders 10. By holding the substance 17 tightly between the piston means 5 and the die 18 good sealing is obtained between the substance and the die, which is necessary if extrusion is to be carried out. Furthermore, particularly with horizontal presses, the substance is retained as required before extrusion. It is also possible, with the help of the auxiliary cylinders 10 to effect an axial additional pressure on the substance during the entire extrusion process. It has been found that the most favourable dimensioning is obtained if the auxiliary cylinders 10 are designed for an internal over-pressure of between 100 and 600 atm. The auxiliary cylinders 10, as well as the auxiliary cylinders 16 also serve to carry out various neutral movements with the piston means 5 and cylinder 3, respectively.

The cylinders 3 and 4 are identical with respect to their general construction and dimensioning. However, differences in length and abutting surfaces may occur. Such differences are of slight importance for the manufacturing costs, but the possibility of making the expensive high pressure cylinders the same considerably decreases the manufacturing costs.

The invention is not limited to the shown embodiment. Several variations and modifications are feasible within the scope of the following claims.

What is claimed is:

1. Pressure means for hydrostatic extrusion comprising two high pressure chambers movable towards each other, a common piston means movable in both the chambers and a conduit for pressure medium between the two chambers, characterized in that the piston means comprises two pressure surfaces of equal area facing each other, one in each of said chambers, at least one auxiliary cylinder and piston pressure means, and means connecting said auxiliary pressure means to the piston means at a point between the pressure surfaces and outside the chambers.

2. Pressure means according to claim 1, characterized in that the conduit between the two high pressure chambers comprises a bore through the piston means.

3. Pressure means according to claim 1, characterized in that a supply conduit for pressure medium is connected to both the pressure chambers through the piston means.

4. Pressure means according to claim 1, characterized in that the extrusion chamber is axially movable, and that auxiliary means are provided to move the extrusion chamber so that a passage is exposed for insertion from the side of a billet in the extruding position.

5. Pressure means according to claim 1, characterized in that the auxiliary pressure means include means to transmit an axial force to the piston means so that during extrusion it abuts the billet and forces this with a certain pressure towards a die with an extrusion nozzle.

6. Pressure means according to claim 1, characterized in that the high pressure chambers comprise hollow cylinders of equal cross section which are radially prestressed by an external stressing means.

7. Pressure means according to claim 1, characterized in that the pressure necessary for extrusion is generated by forcing one of said high pressure chambers up towards the piston means so that the inner volume of said one chamber decreases and the pressure is thus transmitted through said pressure medium conduit to the extrusion chamber.

References Cited
UNITED STATES PATENTS 3,364,716   1/1968   Averill et al. _____ 72—253

CHARLES W. LANHAM, Primary Examiner

L. A. LARSON, Assistant Examiner